Oct. 19, 1948.　　　　　A. F. JOHNSON　　　　2,451,493
PROCESS FOR ENRICHING THE ALUMINA CONTENT OF
CRYOLITE FUSIONS IN ALUMINUM PRODUCTION
Filed Feb. 21, 1946　　　　　　　　　　　3 Sheets-Sheet 1
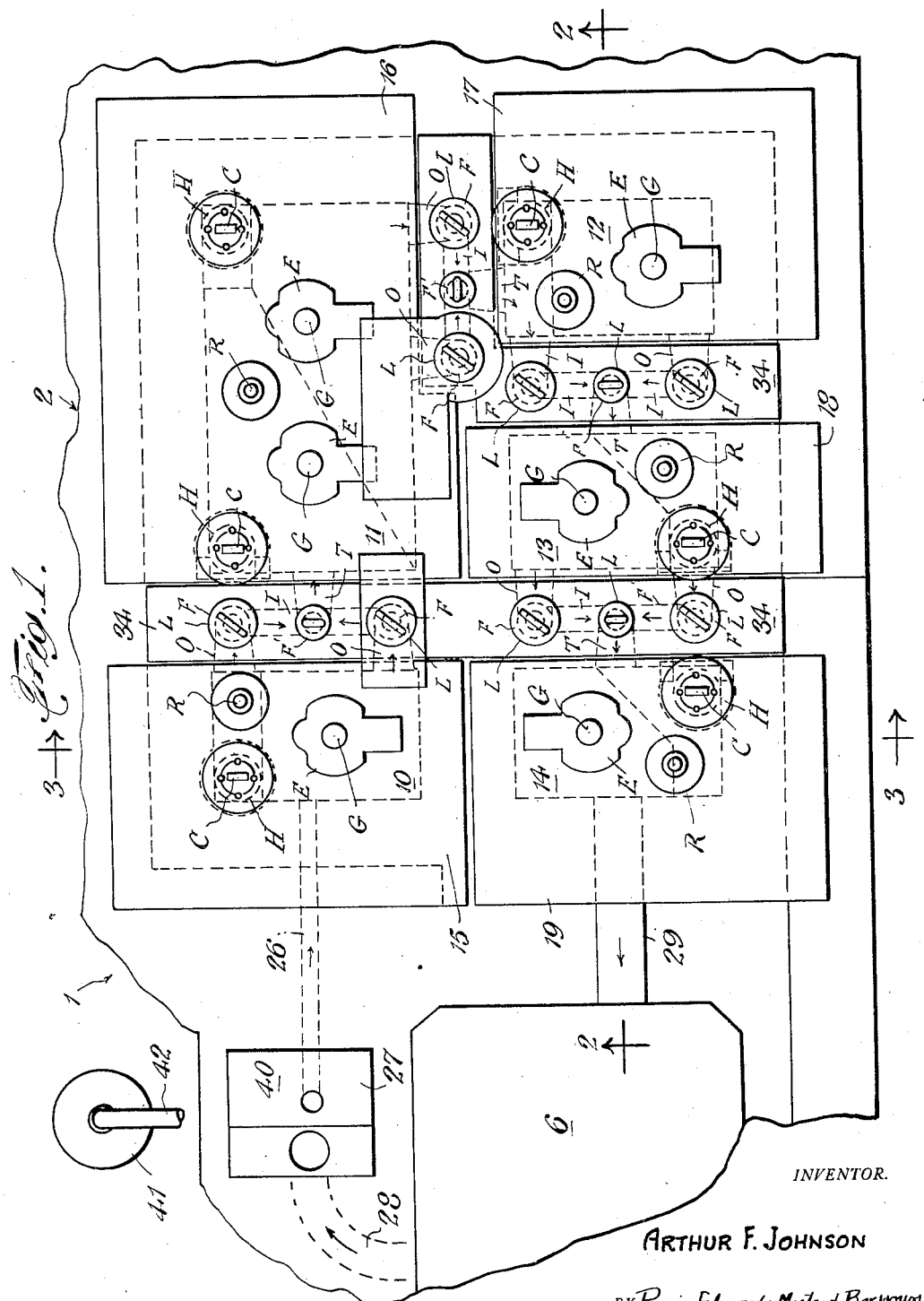
INVENTOR.
ARTHUR F. JOHNSON
BY Pennie, Edmonds, Morton & Barrows
ATTORNEY

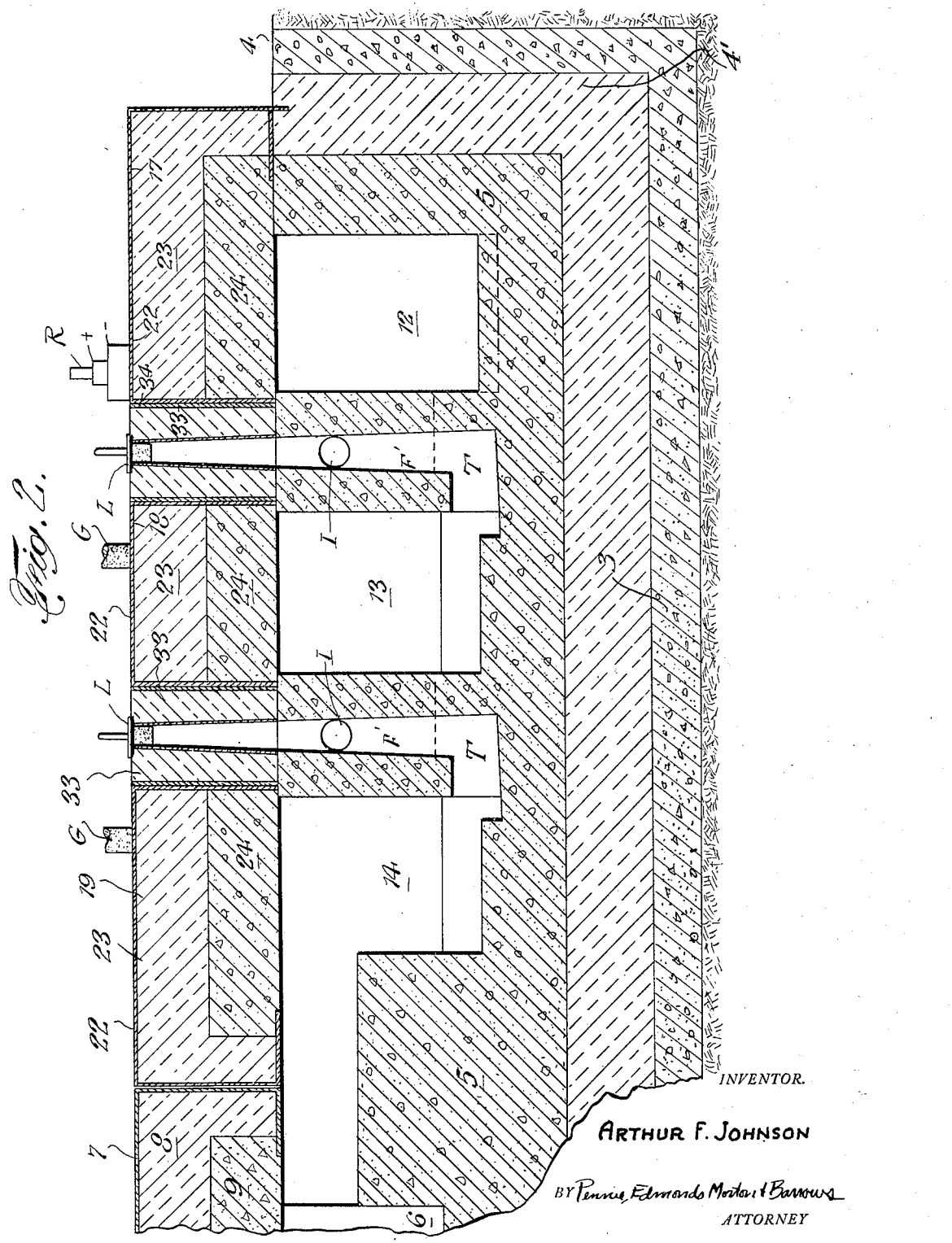

Oct. 19, 1948.  A. F. JOHNSON  2,451,493
PROCESS FOR ENRICHING THE ALUMINA CONTENT OF
CRYOLITE FUSIONS IN ALUMINUM PRODUCTION
Filed Feb. 21, 1946  3 Sheets-Sheet 3
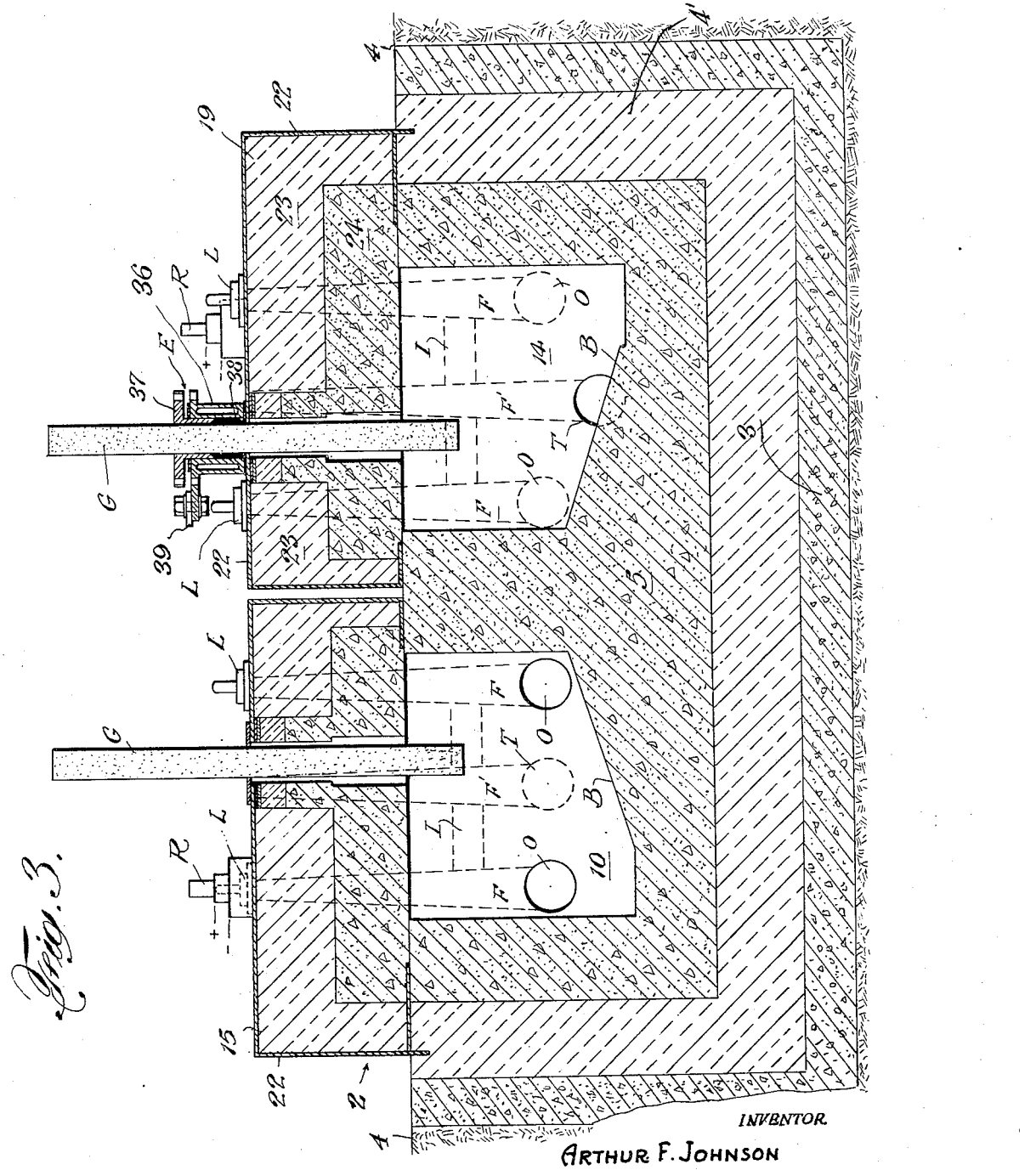
INVENTOR
ARTHUR F. JOHNSON
BY Pennie, Edmonds, Morton & Barrows
ATTORNEY Patented Oct. 19, 1948

2,451,493

UNITED STATES PATENT OFFICE 2,451,493

PROCESS FOR ENRICHING THE ALUMINA CONTENT OF CRYOLITE FUSIONS IN ALUMINUM PRODUCTION

Arthur F. Johnson, Cambridge, Mass., assignor to Reynolds Metals Company, Richmond, Va., a corporation of Delaware Application February 21, 1946, Serial No. 649,299

1 Claim. (Cl. 204—67)

This invention relates to the electrolytic production of aluminum from aluminiferous fusions. The invention is especially concerned with the electrolytic reduction of fusions of alumina dissolved in cryolite and provides an improved apparatus and method for refining impure fusions such as fusions of bauxite in cryolite for use in the electrolytic production of aluminum. The invention, in one of its aspects, comprises the purification of impure alumina-containing materials, especially bauxite ores containing reducible oxidic impurities, such as $Fe_2O_3$, $SiO_2$, and $TiO_2$, in combination with the electrolytic reduction of the alumina of the purified fusion to aluminum.

My invention provides means for passing alumina-depleted fusion from an electrolytic reduction operation to an alumina-enriching and purifying operation and the returning of an alumina-enriched and purified fusion to the reduction operation at a higher temperature than the fusion undergoing reduction. This permits the cell to be covered to suppress the loss of heat and its operation without crust formation.

In a more complete embodiment, my invention provides a method of enriching alumina-depleted cryolite fusions with alumina-containing material having oxidic impurities in which the oxidic impurities are reduced, the reduced metals are separated from the fusion and the fusion enriched with alumina is subjected to electrolytic reduction in an electrolytic cell. In an advantageous embodiment of the invention, I circulate the fusion more or less continuously through chemical reduction and filtering means and through an electrolytic reduction cell, and I replenish the depleted alumina by suitable additions to the fusion of raw impure alumina-bearing material, usually calcined bauxite ore, along with a reducing agent. The feed of impure ore is preferably subjected to a preliminary reduction in the fusion for the more or less selective reduction of $Fe_2O_3$ with separation of the reduced metal.

It is advantageous to introduce the alumina-containing material, for example calcined bauxite, into the alumina-depleted fusion from the reduction cell to dissolve the alumina. I prefer to do this in a stage in immediate connection with the electrolytic cell where the percentage of cryolite is high. In such stage I prefer to introduce carbon, to agitate the fusion by any suitable means to intermix the carbon with the fusion, and to increase the temperature of the fusion preferably by electric heating to facilitate reduction of the impurities. I have found that cryolite acts as a sort of catalyst for the reduction of iron oxide at the temperatures employed and that this catalytic action is even increased by the addition of calcium and barium fluorides. I may, for example, use up to 20% of calcium fluoride, or 10% of calcium fluoride and 2 to 5% of barium fluoride with the balance cryolite, as the solvent. It is to be understood, therefore, that when I refer to cryolite I intend to include cryolite alone or cryolite and either or both of these salts. As a result of this treatment, iron oxide, ($Fe_2O_3$) is reduced and a part of the iron is settled out of the fusion. I prefer to pass the resulting fusion, enriched in alumina, but containing some iron oxide, fine particles of iron, and the $SiO_2$ and $TiO_2$ of the oxidic impurities, into another treatment stage wherein I add heat, if necessary, and aluminum, preferably powdered aluminum or ferroaluminum. Hereinafter, when I refer to the use of aluminum I include metallic aluminum, such as powdered scrap aluminum or suitable alloys of aluminum such as ferroaluminum. In this stage I also prefer to provide electric heating with accompanying agitation to reduce the $SiO_2$ and $TiO_2$ and effect a separation of the resulting silicon and titanium. To this end I prefer to utilize the iron, either the reduced iron or added iron, such as powdered iron or the iron of the ferroaluminum, as a collecting medium for the silicon and titanium. The silicon and titanium alloy with the iron and the resulting alloy is largely separated by settling out of the fusion. When ferroaluminum is used, the residual ferroaluminum dissolves silicon and titanium to form an alloy.

Between the aforementioned stages, it is advantageous to provide a heated carbon filter through which the fusion is passed to reduce some of the iron oxide that was not reduced in the first stage and to separate particles of iron from the fusion.

In the second stage, wherein I add the aluminum, I prefer to add sufficient heat to increase the temperature to around 1050° C. to 1150° C. to intensify the reduction and thereafter to decrease the temperature slightly in the direction of flow. From the second stage, it is desirable to pass the fusion through another heated carbon filter to effect a further reduction of the iron oxide by the carbon of the filter, and a separation of the reduced metals.

Ordinarily, it is desirable to pass the fusion through one or two additional stages similar to the last-mentioned stage in which heat may be added and in which I agitate the fusion. I prefer to add a small amount of powdered aluminum or ferroaluminum to these stages to effect a further reduction of the $SiO_2$ and $TiO_2$, and to use the heated carbon filter where necessary. The temperature from this stage or stages, as the case may be, may be allowed to decrease, say, to 1100° C. or 1000° C.

In order to reduce and separate the impurities to a high degree and to adjust the temperature of the fusion for entry into the electrolyte reduction cell, I prefer to pass the fusion into a final treatment stage wherein the temperature is adjusted to give the fusion a temperature of around 1000° C. The fusion after suitable agitation in the final stage is passed through a final carbon filter for the removal, both by chemical action and physical separation, of the last traces of impurities. The fusion, suitably enriched in alumina, at the proper temperature, and substantially free of oxidic impurities and their reduced metals, is passed into the electrolytic reduction cell; for example, a Hall type cell, wherein the alumina is reduced in the usual way. The invention, however, permits the Hall type cell to be so modified by the provision of an insulating cover that the loss of heat is greatly reduced and objectionable and laborious breaking of crusts is eliminated.

The carbon filters used in the invention may be ducts or channels packed with granular coke, or they may be ducts into which are fitted formed bodies of porous carbon. The filters are so located that they are heated by the electric heating means to temperatures of at least 1000° C., preferably higher, say up to 1150° C., at which temperatures the carbon is a very active reducing agent for iron oxide in the presence of cryolite which acts as a sort of catalyst. The carbon not only acts as a chemical scavenger for the substantial elimination of the iron oxide but as a physical filter for the removal of fine particles of metal carried along in the fusion in suspension. Moreover, as the carbon of the filter becomes laden with metals, the metals may easily be recovered for use as reducing carbon, for example in the first stage, thereby leaving the metals behind to settle out in the fusion after the carbon is consumed.

While the circulation of the fusion may be effected by any suitable means, I prefer to use a "breather cell," such as described more fully and claimed in my copending application Serial Number 647,179, filed February 12, 1946. The breather cell not only provides a means for the introduction into the fusion of the reagents, such as carbon, cryolite, aluminum, etc., but a heating, agitating and metal separating means.

I prefer to carry out the various treatment stages in compartments enclosed to exclude the atmosphere, insulated to save heat, lined with a refractory inert to the fusion, such as carbon pot lining, and to interconnect the compartments through ducts or channels in the refractory. In using a conducting lining, I may advantageously supply the necessary heat by means of graphite electrodes supplied with alternating current. The electrodes preferably enter the various compartments through gas tight electrode holders and the lining, as well as the contents, are heated by the flow of current therethrough. I prefer to construct the entire system of compartments and ducts in a surrounding mass of refractory insulation, such as rammed alumina. Advantageously, the entire system may be formed within a concrete structure in the earth with the top approximately at ground level.

The inlet duct to the first compartment is the discharge duct from electrolytic reduction cell and the discharge duct from the last compartment is the supply duct for the electrolytic reduction cell. The alumina depleted fusion is preferably pumped out of the electrolytic reduction cell and given such an elevation that the fusion flows through all the stages or compartments by gravity flow and returns to the reduction cell. I prefer to use a pump such as is described in my copending application Serial No. 644,252, filed January 30, 1946, to cause the required flow.

I may so control the operation with respect to rate of flow, amount of raw material added, and degree of heating as to obtain any desired alumina enrichment. For example, I may introduce into the electrolytic reduction cell a fusion containing around 8% of alumina. The depleted fusion passed into the first stage may contain, say, around 3% of alumina. I may, however, so control the speed of fusion flow as to decrease the alumina in the outlet from the cell to not more than, say 1%. There is an advantage in maintaining the alumina in the electric reduction cell at the most efficient operating level and my invention permits such flexibility as to accomplish this objective.

The invention will be better understood after considering the following discussion taken in conjunction with the accompanying drawings, in which:

Fig. 1 is a plan view of a combination apparatus embodying the invention;

Fig. 2 is a vertical sectional view along line 2—2 of Fig. 1, and

Fig. 3 is a vertical sectional view along line 3—3 of Fig. 1.

The apparatus illustrated in the drawings comprises two main parts in operative combination, a Hall type electrolytic reduction cell 1, and a purification apparatus 2. These two pieces of apparatus are preferably interconnected for the most efficient conjoint operation and are preferably formed within the same general supporting structure. As shown, the body of concrete 3 which is preferably in the earth and below the floor level 4, is constructed somewhat in the manner of a soaking pit. The interior of both the electrolytic reduction cell and the various compartments and channels or ducts formed in the metal purifying apparatus are lined with carbon pot lining 5 for the reason that it is non-reactive with the materials being treated and is electrically conducting permitting the flow of heating current therethrough. In order to save heat, I interpose a thick layer of refractory insulation 4' such as rammed alumina, between the concrete and the pot lining.

The electrolytic reduction cell comprises a cell chamber 6 for the fusion being subjected to electrolysis. Unlike the ordinary furnace, I provide the close fitting cover 7 which has a layer of heat insulating rammed alumina 8 and an inner lining 9 of carbon pot lining. This cover protects the fusion from the atmosphere, prevents a loss of heat, and the formation of a crust on the upper surface of the fusion. The elimination of a crust saves a great deal in the labor now used in the usual process to break the crust in order that alumina additions may be made to and mixed with the fusion. Fig. 1 shows the reduction cell with the cover removed, and Fig. 2 shows the cell with the cover 7 in position.

While any suitable number of refining receptacles may be used in the refining part, the refining apparatus illustrated comprises five receptacles 10, 11, 12, 13 and 14, shown in broken lines through the removable covers 15, 16, 17, 18 and 19 (Fig. 1). As best shown in Figs. 2 and 3, the covers have metal protecting shells 22, a layer of rammed alumina 23 for heat insulation, and a layer of carbon pot lining 24 facing the open receptacles. The bottoms B of the receptacles are preferably sloped, as best shown in Fig. 3, to facilitate the accumulation at one place of the metals that settle out of the fusion. Each of the receptacles, with the exception of 14, has two outlet ducts O leading into a vertically disposed filter chamber F having a lateral interconnecting duct I leading to another vertically disposed filter chamber F'. Each filter chamber F' connects by a transfer duct T to the next compartment. Receptacle 10 is connected to the cell chamber 6 of the electrolytic cell through the inlet duct 26, pump 27 and duct 28, and receptacle 14 is connected to the cell chamber 6 by means of the discharge duct 29. As best shown in Figs. 2 and 3, the intermediate ducts I are at a substantially higher level than the ducts O and T, the purpose being to give a greater length of travel through the carbon in the filter chambers F and F'. Each of the filter chambers, as illustrated, is in the form of a truncated cone to facilitate opening up the holes by pushing a bar down through them, and is protected at the top with a removable lid L. It will be noted that a body of alumina refractory 33 within a steel shell 34 is mounted directly over the body of pot lining 5 in which the various filter chambers are formed and that the filter chambers extend upwardly through these bodies of refractory. Each of the receptacles 10, 12, 13 and 14 has one hole H through the covers 15 to 19, and receptacle 11 has two holes H through the cover 16. Each of these holes is protected with a small removable cover C. These holes may be used for inspection, for the addition of reacting ingredients, or for the removal of such material as the metals which accumulate at the lower portions of the sloping bottoms B.

Each of the receptacles 10, 12, 13 and 14 is provided with one graphite electrode G, and receptacle 11 is provided with two graphite electrodes G. These electrodes are preferably supplied with alternating current and are suspended within the receptacles by means of the electrode holders E shown in sectional detail in Fig. 3. Each holder comprises a water-cooled holder member 36, a packing gland member 37, and a metal packing 38 in close contact with the electrode. The power is admitted through the connecting bar 39. Each of these holders supports a graphite electrode G and prevents the infiltration of air into the receptacle. The electrodes may be elevated or depressed to increase or decrease the heating and the electric current not only flows through the fusion of each compartment but through the interconnecting walls of pot lining 5 and thereby maintains the entire refining apparatus at a controlled high temperature.

I prefer to effect a circulation of the fusion in one or more of the receptacles to aid in reducing and separating the impurities, and to this end, I mount in each of the compartments a "breather cell" R for agitating the fusion. These breather cells are shown only diagrammatically since they are described fully and claimed in my copending application Serial No. 647,179, filed February 12, 1946. The breather cell not only provides agitation but a means for the introduction of materials to the fusion and the reduction and separation of the impurities. The breather cell contains means into which the metallic impurities, principally reduced metal, settles and a surrounding body of porous carbon through which the fusion is forced to flow. This carbon reduces a considerable amount of the iron oxide, the particles of iron being trapped in the pores of the carbon.

The pump 27 is described fully and claimed in my copending application Serial No. 644,252 filed January 30, 1946 and comprises a vessel 40 into which both ducts 26 and 28 connect and a liquid piston 41 with a pipe 42 connecting to the vessel 40. The liquid piston through the pipe 42 creates in the vessel 40 periodic increases and decreases in pressure resulting in the pumping of fusion from the receptacle 6 into receptacle 10. By reason of the relatively high elevation of receptacle 10 with respect to the succeeding compartments in the circuit, the fusion flows successively therethrough in the direction of the arrows and is discharged through duct 29 back into the electrolytic cell.

The purpose of the porous carbon filters F and F' is two-fold. It will be noted from the shape of the conical chambers for retaining the carbon of the filters and the lateral ducts I that they present relatively long passageways for the flow of the fusion. When pulverized coke, for example, particles of about 20-mesh size, are packed into the filters, the lateral ducts I also become filled with the coke. Since the carbon is usually heated to a temperature over 1050° C. it is very reactive to iron oxide in the presence of cryolite which serves somewhat as a catalyst. The carbon serves somewhat as a chemical scavenger for the reduction of small traces of iron oxide and the removal of the reduced particles of iron by filtration. Each carbon filter, therefore, is a chemical reagent as well as a physical filtering medium. While much of the residual ferroaluminum and the alloy thereof saturated with silicon and titanium settle to the bottom of the various receptacles, there is an appreciable amount of extremely fine particles of ferroaluminum, the saturated alloy, iron, silicon and titanium which are carried along in suspension in the fusion. One of the functions of the carbon filters is to catch these metallic particles and thus separate them from the fusion.

Instead of packing the filters with granular coke, I may use formed bodies of porous coke and insert them into the passageways through which the fusion flows; for example, I may reverse the conical shape of the filters having the large diameter part at the top and insert therein conically formed blocks of porous coke. The porous coke presents a very large surface to the flowing fusion and is a very effective reducing and filtering medium.

In carrying out a method of the invention with apparatus such as that illustrated in the drawings, the molten fusion of alumina dissolved in cryolite in receptacle 6 becomes depleted in alumina due to its reduction and the alumina-depleted fusion is sucked through duct 28 by the pump 40 and discharged through duct 26 into receptacle 10. I prefer to use instead of more or less straight cryolite as the alumina solvent, as much as 20% of calcium fluoride, or say 10% of calcium fluoride and 2 to 5% of barium fluoride, with the balance cryolite. The fusion may contain, for example, from 1% to 8% of alumina depending upon the character of the operation being carried out. In receptacle 10 carbon is preferably introduced into the fusion along with the make-up alumina to enrich the fusion. I may use any suitable alumina-containing material containing such oxidic impurities as $Fe_2O_3$, $SiO_2$, and $TiO_2$. A typical example of a raw material is calcined bauxite, such as calcined Haitian bauxite which usually contains the following materials:

| | |
|---|---|
| $Al_2O_3$ | 61.59 |
| $Fe_2O_3$ | 27.71 |
| $TiO_2$ | 4.01 |
| $SiO_2$ | 4.55 |
| Ignition loss | 1.70 |

As shown in the drawings, the breather cell R is used for the introduction to the fusion of the raw feed materials and to effect a circulation or agitation of the fusion in each compartment. In the breather cell of compartment 10, a mixture of dry pulverized coke and calcined bauxite are introduced. The coke is in an amount sufficient to reduce the iron oxide. In the breather cell a large part of the reduced iron settles out of the fusion. The alumina-enriched fusion is forced through a carbon filter in the breather cell into the body of alumina-depleted fusion in the receptacle 10. Since receptacle 10 is at a considerably higher elevation than the other receptacles, the alumina-enriched fusion flows by gravity through ducts O, filters F, ducts I, filter F', and duct T into compartment 11. The fusion entering compartment 10 is usually at a temperature around 950° C. to 990° C. and the electrode G is adjusted to increase the temperature 25° C. or more. The fusion in compartment 11 contains the impurities $SiO_2$ and $TiO_2$ and residual iron oxide. Either into compartment 11 or into the breather cell I add aluminum, preferably ferroaluminum in a pulverulent form which is admixed with the fusion by means of the breather cell R. The ferroaluminum performs a dual function. The aluminum is a reducing agent for the $SiO_2$ and $TiO_2$ and the molten iron which remains acts as a collecting medium for the reduced silicon and titanium. In this compartment the molten residual ferroaluminum dissolves these elements to form an alloy which may become saturated with about 8% of silicon and 5% of titanium. Most of this alloy, particles of reduced iron and residual ferroaluminum settle to the bottom and flow along the sloping bottom towards the left, as viewed in Fig. 1, to the vicinity of the holes H. By removal of the cover C, the alloy may be pumped out from time to time by inserting a tube to the bottom of the receptacle.

In receptacle 11 the fusion is heated to its highest temperature which may be in the neighborhood of 1000° C. to 1150° C. to ensure the iron or ferroaluminum which is used to collect the reduced silicon and titanium being in the molten state. This is accomplished by the two electrodes G. The fusion in a highly fluid state is effectively agitated by the breather cell, thus establishing good reacting contact between the oxidic impurities and the reducing agents. The fusion flows by gravity through ducts O, filters F, ducts I, filter F', and duct T into receptacle 12. Additional ferroaluminum may be added through hole H or to the breather cell. Although heat may be supplied to the fusion through the electrode G, the temperature is allowed to decrease slightly over that in compartment 11. The metals which are reduced may settle out of the fusion as described above and be removed through hole H. The fusion flows by gravity through ducts O and filters F, ducts I, filter F', and duct T into compartment 13. In compartment 13 some pulverized ferroaluminum may be added to the fusion if required, through hole H or to the breather cell and the metallic impurities are removed through the hole H. While the electrode G is operated to add heat, the amount is insufficient to increase the temperature. Preferably the fusion is permitted to cool slightly. From compartment 13 the fusion flows by gravity through ducts O, filters F, ducts I, filter F', and duct T into receptacle 14. In this compartment I may or may not add ferroaluminum depending upon the condition of the fusion. Usually the fusion is substantially free of oxidic impurities and the only function of the compartment is to permit separation of entrained particles of metals and an adjustment of the temperature. The breather cell may be used only on special occasions or it may be eliminated from this cell. The temperature in this compartment may be around 1000° C. and the fusion flows by gravity through the duct or channel 29 into the receptacle 6. The fusion preferably contains around 8% of alumina and is substantially free of the oxides $Fe_2O_3$, $SiO_2$, and $TiO_2$.

By means of my invention, I am able to purify a crude bauxite ore. In an operation far simpler and more economical than the presently used Bayer process, I am able to effect a substantial elimination of the troublesome oxidic impurities and to produce an alumina-enriched fusion of such purity that the electrically produced alumina is of extremely high purity.

I claim:

In the electrolytic production of aluminum from a fusion of cryolite containing dissolved alumina, the improvement which comprises circulating the alumina-containing fusion through an electrolytic cell in which it is subjected to electrolysis resulting in a diminution of the alumina content of the fusion and in liberation of fused metallic aluminum, transferring the fluoride fusion depleted in alumina from the cell to an alumina-replenishing zone having a plurality of separate but connected stages by bringing said alumina-depleted fusion into contact with a charge of alumina-containing feed material having oxidic impurities, including the oxides of iron, silicon and titanium, and carbon as a reducing agent in one stage, selectively reducing a part of the iron oxide in said stage, passing the alumina-enriched fusion through a carbon filter maintained at a temperature between about 1000° C. and 1150° C. to reduce iron oxide not reduced in said first stage and into a second stage maintained at a temperature of from about 1000° C. to 1150° C., mixing metallic aluminum with the fusion in said second stage to reduce the silicon and titanium oxides, collecting the reduced silicon and titanium with a molten alloying agent from the class consisting of iron and ferroaluminum, withdrawing the alumina-enriched fusion from said second stage, reducing the temperature of the fusion withdrawn from said second stage, and passing the fusion at the reduced temperature into the electrolytic cell.

ARTHUR F. JOHNSON.

REFERENCES CITED

The following references are of record in the file of this patent:

UNITED STATES PATENTS

| Number | Name | Date |
|---|---|---|
| 334,208 | Wetherill | Jan. 12, 1886 |
| 1,310,342 | Hutchins | July 15, 1919 |
| 1,881,872 | Neuman | Oct. 11, 1932 |
| 2,024,242 | Moschel | Dec. 17, 1935 |
| 2,083,648 | Gorke | June 15, 1937 |
| 2,162,942 | DeRohden | June 20, 1939 |

FOREIGN PATENTS

| Number | Country | Date |
|---|---|---|
| 25,408 | Great Britain (1907) | Nov. 16, 1908 |
| 217,376 | Great Britain | June 19, 1924 |